United States Patent
Imura

[11] Patent Number: 5,248,119
[45] Date of Patent: Sep. 28, 1993

[54] CLAMP BODY FOR FIXING SMALL-DIAMETER PIPE

[75] Inventor: Izumi Imura, Tagata, Japan

[73] Assignee: Usui Kokusai Sangyo Kaisha Ltd., Japan

[21] Appl. No.: 779,020

[22] Filed: Oct. 16, 1991

[30] Foreign Application Priority Data

Oct. 18, 1990 [JP] Japan .................. 2-280446

[51] Int. Cl.$^5$ .................................. F16L 3/08
[52] U.S. Cl. ............................ 248/65; 248/300
[58] Field of Search ............ 248/65, 74.1, 300, 301, 248/49, 205.1

[56] References Cited

U.S. PATENT DOCUMENTS

| | | | |
|---|---|---|---|
| 967,902 | 8/1910 | Griffiths | 248/74.1 |
| 2,058,752 | 10/1936 | Wray | 248/65 |
| 2,672,314 | 3/1954 | Mitchell | 248/65 X |
| 3,173,639 | 3/1965 | Dunn | 248/74.1 X |
| 3,565,374 | 2/1971 | Jones | 248/74.1 X |
| 3,853,148 | 12/1974 | De Vincent et al. | 248/74.1 X |
| 4,433,821 | 2/1984 | Bolding et al. | 248/65 |
| 4,909,462 | 3/1990 | Usui | 248/74.1 |
| 4,951,902 | 8/1990 | Hardtke | 248/74.1 |

FOREIGN PATENT DOCUMENTS 2395418  1/1979  France ................ 248/74.1

Primary Examiner—David A. Scherbel
Assistant Examiner—Derek J. Berger
Attorney, Agent, or Firm—Anthony J. Casella; Gerald E. Hespos

[57] ABSTRACT

A clamp body is provided for fixing a small diameter pipe to a base. The pipe has first and second straight portions and a bend therebetween. The clamp body is formed from a unitary member having first and second opposed ends and a fitting wall therebetween. The fitting wall has an aperture for mounting the clamp body to the base. First and second extension walls extends from the fitting wall toward the ends. Seizing walls are defined on the respective extension walls. Each seizing wall is bent through more than 180° for fixedly embracing the respective straight pipe portions relative to the base. At least one of the extension walls is angularly bent relative to the fitting wall at a location spaced from the pipe.

12 Claims, 4 Drawing Sheets

CLAMP BODY FOR FIXING SMALL-DIAMETER PIPE

BACKGROUND OF THE INVENTION

1. Field of the Invention

The present invention relates to a clamp body for fixing a metallic pipe having a relatively small diameter of approximately 20 m/m or under which is arranged as a feed line of fuels, other oils, air, etc. to generally an automobile or a variety of machines and equipments.

2. Description of the Prior Arts

This type of conventional fixing clamp body is constructed such that one end of a band member in the longitudinal direction is shaped as a fitting wall bored with a bolt hole, the other end thereof is provided with a notched circular seizing wall, thus configuring the clamp body. A proper straight pipe portion on the side of the pipe is fixed while being secured with the seizing wall. Alternatively, the fixing clamp body is constructed such that an inner peripheral surface of the seizing wall is brazed to an outer peripheral surface of the pipe, thus effecting the fixation.

In the former arrangement, this type of conventional clamp body presents the following problems. The straight pipe portion of the pipe is fixed by the seizing process. Consequently, positional deviations in the lengthwise and peripheral directions are caused on the side of the pipe; or frictional flaws are produced due to these positional deviations because of excitations of a car body or machine or equipment under a piping condition. This in turn brings about cracks and breakage. An anti-corrosive film plated or coated on an outer peripheral surface of the pipe is exfoliated. The latter arrangement, though the problem of the positional deviation is substantially obviated, presents such problems that the anti-corrosive film processing by plating is inevitably effected on the whole product after brazing, and further cracks and breakage are caused due to a thermal deterioration by heating on the occasion of brazing.

SUMMARY OF THE INVENTION

It is a primary object of the present invention, which has been devised in the light of the foregoing problem, to provide a clamp body for fixing a small-diameter pipe capable of effectively performing securing and fixation by absolutely eliminating an anxiety for frictional flaws or positional deviations caused on the side of a pipe at seizing walls even under excitations, employing the pipe and clamp body to which an anti-corrosive film is previously applied, and sufficiently protecting the anti-corrosive film on an outer peripheral surface of the pipe without a necessity for a heating process such as brazing and the like.

To accomplish the object given above, according to one aspect of the present invention, there is provided a clamp body for fixing a small-diameter pipe, wherein a portion substantially in the vicinity of the center of a tabular member in the longitudinal direction is formed as a fitting wall to a target base, seizing walls for embracingly fixedly securing straight pipe portions at both ends of the pipe astride a bent or curved bending portion of the pipe are provided at both ends bent at a predetermined angle. In the securing/fixing state of the pipe, the fitting wall is positioned in a direction substantially parallel with, substantially orthogonal to or inclined to the pipe bending plane. The portion substantially in the vicinity of the center of the tabular member in the longitudinal direction is folded to form a double-laminated wall, thus providing the fitting wall. The fitting wall is positioned outwardly or inwardly of the pipe bending portion. An elastic member composed of a collar, a split-bush, a band or a tube is fitted or bonded to inner peripheral surfaces of the seizing walls or an outer peripheral surface of the pipe.

According to the present invention thus constructed, the clamp body includes the seizing walls for embracingly fixed securing the straight pipe portions at both ends of the pipe astride the bending portion of the pipe. When the external force acting in the lengthwise or peripheral direction is exerted on one of the seizing walls having different directions under excitations in the arranged state, the wall surface of the other seizing wall undergoes this force to generate a sufficient reaction force. Fixation with an extremely high rigidity can be performed. It is also possible to surely perform securing and fixation by extremely effectively preventing positional deviations in the lengthwise and peripheral direction on the side of the pipe for a long period of time or frictional flaws due to the positional deviations. Protected well are the anti-corrosive films previously applied to the outer peripheral surface of the pipe and surface of the clamp body.

BRIEF DESCRIPTION OF THE DRAWINGS

Other objects and advantages of the present invention will become apparent during the following discussion taken in conjunction with the accompanying drawings, in which.

DETAILED DESCRIPTION OF THE PREFERRED EMBODIMENTS

Figure 1:
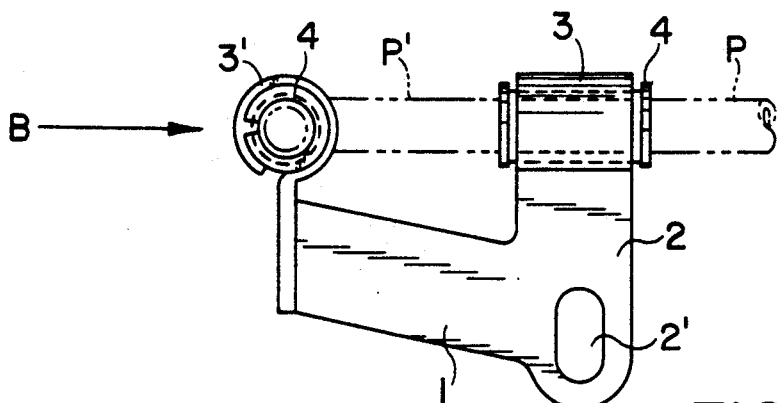
FIG. 1 is a front elevation showing securing/fixing states of a pipe of a clamp body for fixing a small-diameter pipe in one embodiment of the present invention.
Figure 2A:
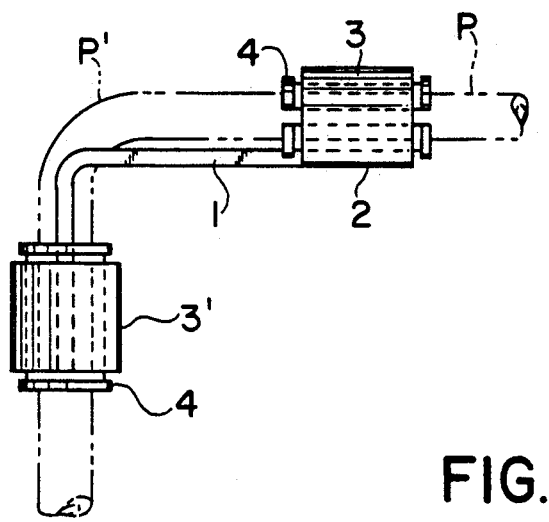
FIG. 2A is a top view of FIG. 1.
Figure 2B:
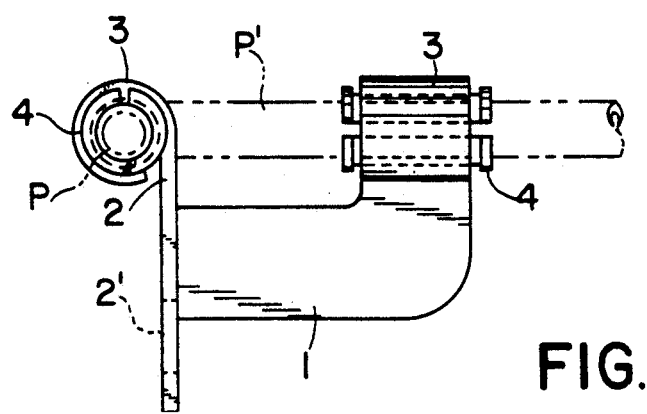
FIG. 2B is a view taken in an arrowed direction B of FIG. 1.
Figure 3:
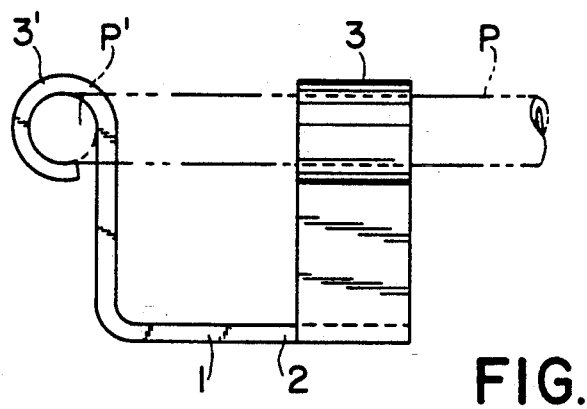
FIG. 3 is a corresponding view of FIG. 1, showing another embodiment.
Figure 4:
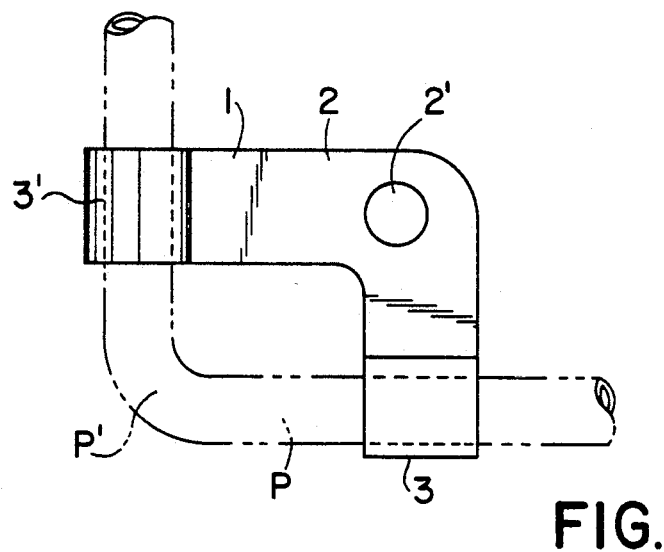
FIG. 4 is a top view of FIG. 3.
Figure 5:
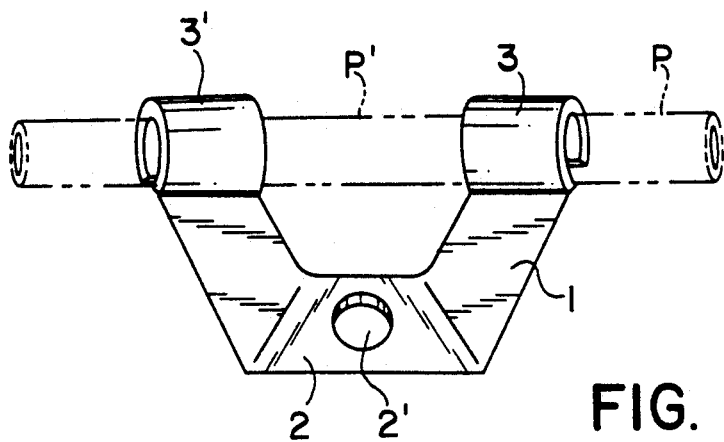
FIG. 5 is a corresponding view of FIG. 1, illustrating still another embodiment.
Figure 6:
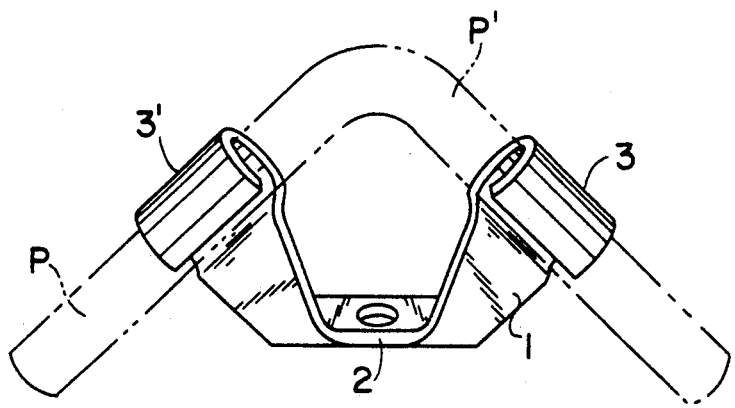
FIG. 6 is a top view of FIG. 5.
Figure 7:
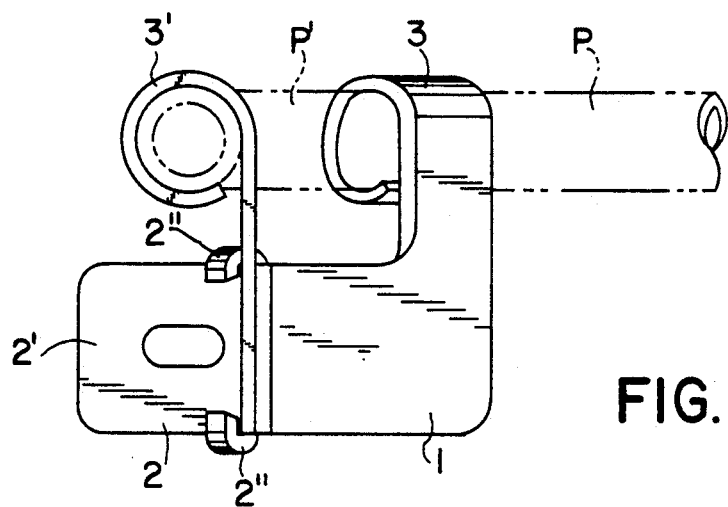
FIG. 7 is a corresponding view of FIG. 1, illustrating a further embodiment.
Figure 8:
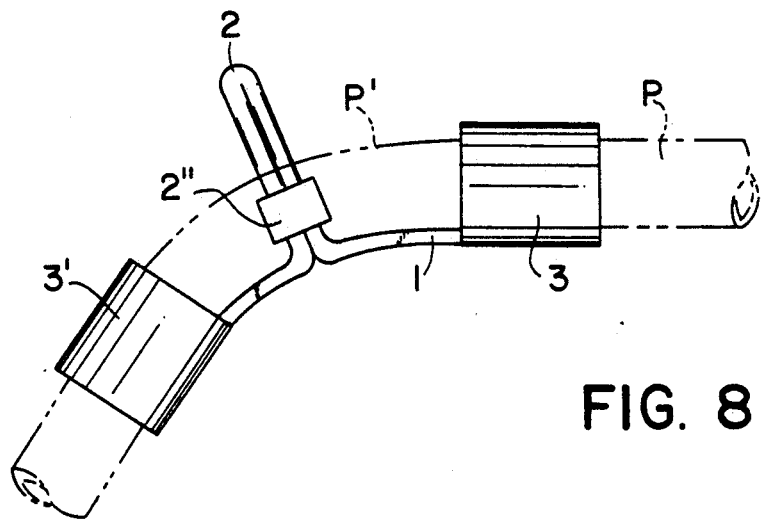
FIG. 8 is a top view of FIG. 7.
Figure 9:
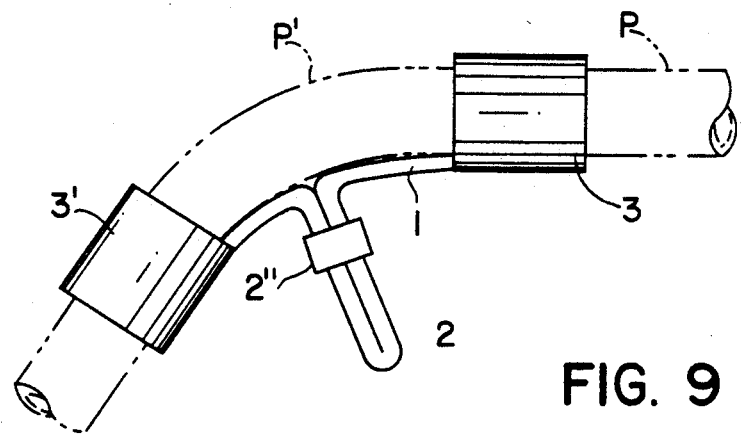
FIG. 9 is a top view illustrating the embodiment of FIG. 8.

Referring to FIGS. 1 through 11, the numeral (1) represents a clamp body attached to a target base (not illustrated). The clamp body is formed in the following manner. A portion substantially in the vicinity of the center of a tabular member in the longitudinal direction is shaped as a flat fitting wall (2) formed with a fitting bolt hole (2') assuming a circular or slot-like configuration. The tabular member is bent at a predetermined angle. Curled seizing walls (3, 3') are formed at both side ends thereof. The straight pipe portions at both ends of the pipe (P) are embracingly fixedly secured with the seizing walls (3, 3') astride a bent or curved bending portion (P') of the metallic pipe (P) having a relatively small-diameter smaller than the above-mentioned pipe diameter. The fitting wall (2) is positioned (FIGS. 1 and 2) in a direction substantially orthogonal to a bending plane of the pipe (P) or positioned in a substantially parallel direction (FIGS. 3 and 4) or positioned in an inclined direction (FIGS. 5 and 6) and at the same time positioned inwardly of the bending portion (P'). Designated at (4) is a resinous or rubber elastic member (FIGS. 1 and 2) assuming a collar-like, split-bush-like, band-like or tubular configuration, the elastic member being fitted or bonded to the seizing walls (3, 3') or the outer peripheral surface of the pipe (P) as the necessity arises. As illustrated in FIGS. 7 to 9, the portion substantially in the vicinity of the center of the tabular member in the longitudinal direction is folded to form a double-laminated wall. At the same time, this double-laminated wall may also serve as a fitting wall (2) by fastening the wall with a curled member (2") to increase a rigidity of the double-laminated wall.

Figure 10:
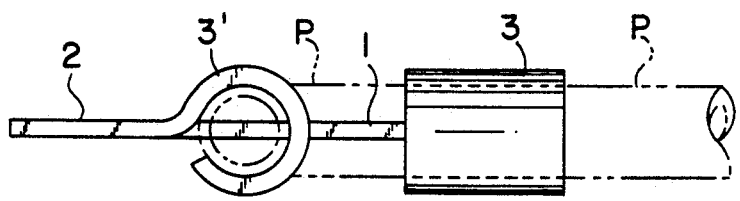
FIG. 10 is a corresponding view of FIG. 1, showing a still further embodiment.
Figure 11:
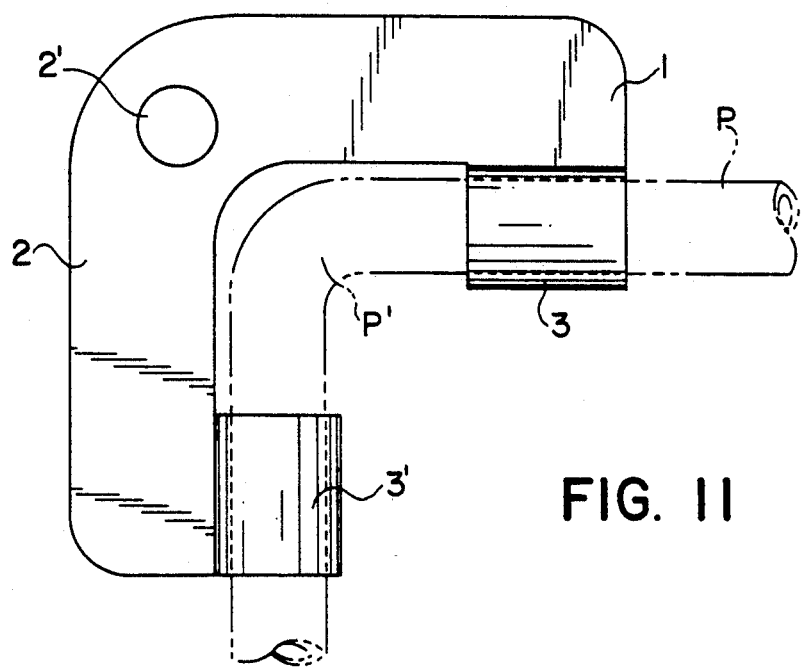
FIG. 11 is a top view of FIG. 10.

Further, the bending portion (P') of the pipe (P) is, as depicted in FIGS. 10 and 11, formed substantially on the same plane, whereby the rigidity of the clamp body is further improved. On this occasion, the fitting wall (2) can be also positioned outwardly of the bending portion (P').

As discussed above, the clamp body for fixing the small-diameter pipe according to the present invention is constructed such that the straight pipe portions on the both sides of the pipe (P) are embracingly fixedly secured with the seizing walls (3, 3') in different directions astride the bending portion (P') of the pipe (P). Hence, the wall face of at least one of the seizing walls (3, 3') undergoes the external force under excitations in a long-term arranged state. The positional deviations both in the lengthwise direction and in the peripheral direction of the pipe (P) are thereby effectively prevented. The fixation with a high rigidity is attainable. It is therefore possible to effect securing and fixation by eliminating an anxiety for the frictional flaws of the pipe at the securing/fixing portion or the cracks and breakage particularly in combination with the unnecessity for the heating process. Simultaneously, a usable arrangement is that the outer peripheral surface of the pipe (P) and the surface of the clamp body may be coated with anti-corrosive films. The anti-corrosive films can be sufficiently protected. The clamp body for fixing the small-diameter pipe is thus extremely useful.

Although the illustrative embodiments of the present invention have been described with reference to the accompanying drawings, it is to be understood that the present invention is not limited to those embodiment. Various changes or modifications may be effected therein by one skilled in the art without departing from the cope or spirit of the invention.

I claim:

1. In combination with a small-diameter pipe, a clamp body for fixing the pipe to a base, said pipe having first and second straight pipe portions and a bending portion therebetween, said clamp body being formed from a unitary tabular member having first and second opposed ends and a fitting wall therebetween, said fitting wall having an aperture means therethrough for mounting the clamp body to the base, first and second extension walls extending from the fitting wall toward the respective first and second opposed ends, first and second seizing walls extending unitarily from the respective first and second extension walls to the respective first and second opposed ends, the first and second seizing walls being bent through more than 180° for embracingly fixedly securing around the respective first and second straight pipe portions relative to the base, at least one of the first and second extension walls being angularly bent relative to the fitting wall of the clamp body at a location spaced from the pipe.

2. The clamp body as set forth in claim 1, wherein said first and second straight pipe portions define a bending plane, and wherein said fitting wall is substantially parallel with the bending plane of said pipe.

3. The clamp body as set forth in claim 1, wherein the fitting wall is folded to form a double-laminated wall.

4. The clamp body as set forth in claim 1, wherein said fitting wall is positioned radially outwardly of said bending portion of said pipe.

5. The clamp body as set forth in claim 1, wherein an elastic member is interposed between inner peripheral surfaces of said seizing walls and an outer peripheral surface of said pipe.

6. The clamp body as set forth in claim 5, wherein said elastic member is a split-bush.

7. A clamp body as set forth in claim 1 wherein both of said first and second extension walls are bent relative to the fitting wall.

8. The clamp body as set forth in claim 7 wherein the first and second extension walls are orthogonal to the fitting wall.

9. The clamp body as set forth in claim 1 wherein the first and second straight pipe portions define a bending plane, and wherein said fitting wall is substantially orthogonal to the bending plane.

10. The clamp body as set forth in claim 1 wherein said fitting wall is positioned radially inwardly of said bending portion of said pipe.

11. The clamp body as set forth in claim 1 wherein the extension walls define curves generally conforming to the bending portion of the pipe.

12. A clamp body for fixing a small-diameter pipe to a base, said pipe having first and second straight pipe portions and a bending portion therebetween, said clamp body being formed from a unitary tabular member having first and second opposed ends and a fitting wall therebetween, said fitting wall being folded to form a double-laminated wall having an aperture means therethrough for mounting the clamp body to the base, first and second extension walls extending from the fitting wall toward the respective first and second opposed ends, at least one of the first and second extension walls being angularly bent relative to the fitting wall of the clamp body, first and second seizing walls unitary with the first and second extension walls and at the respective first and second opposed ends, the first and second seizing walls being bent through more than 180° for embracingly fixedly securing around the respective first and second straight pipe portions relative to the base, the clamp body further comprising a curled member for securely retaining the folded portions of the fitting wall in face-to-face relationship for increasing rigidity of the double-laminated wall.

* * * * *